US007676351B2

(12) United States Patent
Jandhyala et al.

(10) Patent No.: US 7,676,351 B2
(45) Date of Patent: Mar. 9, 2010

(54) STATISTICAL ANALYSIS OF COUPLED CIRCUIT-ELECTROMAGNETIC SYSTEMS

(75) Inventors: Vikram Jandhyala, Seattle, WA (US); Arun V. Sathanur, Chandler, AZ (US); Ritochit Chakraborty, Seattle, WA (US)

(73) Assignee: University of Washington, Seattle, WA (US)

( * ) Notice: Subject to any disclaimer, the term of this patent is extended or adjusted under 35 U.S.C. 154(b) by 378 days.

(21) Appl. No.: 11/778,568

(22) Filed: Jul. 16, 2007

(65) Prior Publication Data

US 2008/0015829 A1  Jan. 17, 2008

Related U.S. Application Data

(60) Provisional application No. 60/807,462, filed on Jul. 14, 2006.

(51) Int. Cl.
*G06F 17/10* (2006.01)
(52) U.S. Cl. .................................. 703/2; 703/14; 716/4
(58) Field of Classification Search ...................... 703/2, 703/13, 14; 716/1–4
See application file for complete search history.

(56) References Cited

U.S. PATENT DOCUMENTS

| 6,732,064 | B1 * | 5/2004 | Kadtke et al. | 702/189 |
|---|---|---|---|---|
| 6,970,560 | B1 * | 11/2005 | Hench et al. | 379/417 |
| 7,149,666 | B2 * | 12/2006 | Tsang et al. | 703/2 |
| 7,295,137 | B2 * | 11/2007 | Liu et al. | 341/51 |
| 7,356,791 | B2 | 4/2008 | Rautio | 716/5 |
| 7,475,102 | B2 * | 1/2009 | Nagahara | 708/250 |
| 2006/0200724 | A1 * | 9/2006 | Stankovic et al. | 714/758 |

OTHER PUBLICATIONS

Tang et al., K. A Statistical Model of Wave Scattering from Random Rough Surfaces, Sciencedirect, International Journal of Heat and Mass Transfer, vol. 44, Iss. 21, Nov. 2001, pp. 4059-4073.*

Ling et al., "Large-scale broadband parasitic extraction for fast layout verification of 3D RF and mixed-signal on-chip structures," IEEE MTT-S Int. Microwave Symp. Dig. Fort Worth, TX, pp. 1399-1402, Jun. 2004.

* cited by examiner

*Primary Examiner*—Russell Frejd
(74) *Attorney, Agent, or Firm*—Ronald M. Anderson

(57) ABSTRACT

A method and system for combining the process variations in circuits and distributed interconnect-based electromagnetic (EM) objects in order to capture a statistical behavior of overall circuit performance parameters. In an exemplary approach, a coupled circuit-EM system is decoupled at the points where the EM objects connect to the circuit portion, and circuit ports are defined at those points. The sources of variation are identified and used to determine Y-parameters for the ports with EM elements and for all EM elements based on the SPICE-like and EM full-wave simulations. A response surface is generated for each variable and is used to extract circuit and EM parameters by generating many random vectors representing combinations of the random variables. These Y-parameters are merged to produce a probability density function (PDF) of one or more performance metrics for the electronic device or system.

21 Claims, 10 Drawing Sheets

82 (TYP.)

80

MESHED SPIRAL INDUCTOR

STATISTICAL ANALYSIS OF COUPLED CIRCUIT-ELECTROMAGNETIC SYSTEMS

RELATED APPLICATIONS

This application is based on a prior copending provisional application, Ser. No. 60/807,462, filed on Jul. 14, 2006, the benefit of the filing date of which is hereby claimed under 35 U.S.C. §119(e).

GOVERNMENT RIGHTS

This invention was made with U.S. Government support under grant Nos. 0093102 and 0203518 awarded by the National Science Foundation (NSF). The U.S. Government has certain rights in the invention.

BACKGROUND

The increasing need for higher data rates is continuously pushing the carrier frequencies of communication systems higher. This trend is complemented by the scaling down of device and interconnect dimensions that enable enhanced functionality on a single chip. The flip side of this continuing development is the increasing susceptibility of circuits to process variations, which produce lower yields.

Thus, as technology continues to shrink the size of electronic devices, the need to model the effect of process variations on circuit performance is becoming increasingly important. Process variations affect the performance of both active and passive components of many electronic devices or systems, which makes it necessary to include distributed interconnect structures for capturing the effect of process variations on overall circuit performance. Accordingly, it would be desirable to combine the process variations of circuits with the distributed interconnect-based passive components in a model, in order to capture the statistical behavior of overall device performance parameters, enabling the calculation of Probability Density Functions (PDFs) for key performance metrics of electronic devices and systems. As those of ordinary skill in statistical circuit analysis will appreciate, the PDF of a random variable is a measure of the probability of the random variable falling within a unit interval, at a specific value of the variable. The PDF for a parameter is often presented graphically and can be a discrete or a continuous function of the random variable. In the case of a discrete sample space, the PDF is called the probability mass function and is equal to the probability that the random variable takes on a specific value from the sample space.

The calculation of PDFs for one or more statistical variables during the development of an electronic device is important because a circuit designer can employ a PDF to evaluate the statistical behavior of a variable in regard to a proposed design and then modify the design as necessary to ensure that the yield of devices that meet specifications is at an acceptable level. Too often, this type of information is only developed after a design is entering the manufacturing stage, so that longer development times and substantial costs must then be incurred to modify the design, based on empirical results provided by initial production testing. Clearly, if an efficient technique were available to statistically evaluate a design in regard to key performance metrics, by calculating the PDF of one or more statistical variables before the design phase is concluded, products should be able to reach the marketplace much sooner, at a lower cost, and at a higher profitability to the manufacturer.

One technique for dealing with such problems is to use a combination of analytical techniques and response surface methodology to predict the statistical behavior of performance measures from the distributions of lower level process parameters. In another approach, a response surface technique has been used with a Technology CAD approach to determine the spread of circuit performance measures. In a recent work, the issues pertaining to asymptotic evaluation of the PDF of a random variable that can be expressed as a $2^{nd}$ order response surface have been addressed.

However, conventional approaches to modeling statistical behavior are generally limited to circuit variables and have not attempted to combine circuit variables and electromagnetic (EM) variables of an electronic device to achieve a more accurate analysis. Modem Radio Frequency (RF) circuits operating at very high frequencies, e.g., at 10 GHz and above, such as on-chip inductors, need accurate modeling of passive components. While the characterization of distributed interconnect structures can be accomplished using field solvers, lumped elements and active components require the use of SPICE-like circuit simulators (the acronym "SPICE" refers to the well-known Simulation Program with Integrated Circuit Emphasis software).

Compared to the literature on statistical variability in circuits, little work has been undertaken in the area of statistical study on the performance of EM structures although this is of equal importance in present day design manufacturability analysis. The impact of variability on board level signal integrity using time domain reflectometry (TDR) measurements, field solvers and resistance, inductance, conductance, and capacitance (RLGC) transmission line models in HSPICE™ has been addressed. In another work, a commercial field simulator and linear regression tool have been used to perform statistical analysis of filters on liquid crystal polymers (LCP) substrates. In view of the large dimensions compared to on-chip distributed structures, the percentage standard deviations compared to mean values is small, allowing linear approximations for the objective functions in terms of the varying parameters, and thereby producing Gaussian PDFs. It has been found that for large standard deviations of parameters contributing to variability of on-chip passive components, quadratic response surfaces are more appropriate. There is a noticeable deviation of the quadratic response surfaces from the Gaussian profile for the desired objective functions. This observation is true for both circuit and EM variability.

With increasing frequency of operation of chips, passive components, such as on-chip spiral inductors, need to be modeled using field solvers in order to accurately capture all of the EM effects. Since process variations affect both circuits and EM structures or components, there is a clear requirement for an automated way of combining the two analysis tools to predict the impact of process variations on the overall circuit performance. One approach to accomplish this goal might be to also include parametric circuit models for the EM components in a SPICE-like simulator when constructing the response surface. There are two impediments associated with this approach. First, using circuit models for EM objects requires the complex step of generating parameterized, passive, and accurate RLC models at high frequencies. Second, since process variations are becoming greater, even for EM objects, the PDFs of the parameters defining the passives will be non-Gaussian and correlated in addition to being numerically computed. It is very difficult to generate samples from such distributions.

Accordingly, there are two critical issues for high frequency RF circuits in emerging technologies that need to be addressed. As noted above, particularly in regard to RF electronic devices, a method is needed to implement statistical analysis of combined circuit-EM systems. In addition, a method is needed that can address the challenge of non-Gaussian, correlated parameters representing the electromagnetically modeled passive components, as well as Gaussian and uncorrelated parameters.

SUMMARY

A methodology has thus been developed for statistical analysis of EM components in electronic devices or systems. More importantly, this procedure can also be applied to the statistical analysis of coupled circuit-EM electronic devices or systems. The statistical analysis of on-chip spiral inductors illustrates that extracted circuit equivalent parameters exhibit non-Gaussian PDFs. These PDFs become more skewed for larger process variations, which occurs because the objective functions have to be modeled using a $2^{nd}$ order response surface. Thus, it is not possible to simply include the circuit equivalents of EM components in circuit simulators and use a Gaussian PDF to account for their variation. Further, it is extremely difficult to generate random numbers with PDFs that are non-Gaussian and are known only numerically. Also there can be correlation between these numerical PDFs, rendering the problem still more difficult.

To circumvent this difficulty, the circuit and EM components or objects of an electronic device or system are decoupled at the points where the EM objects connect to the circuit, as indicated, for example, in a conventional netlist. Then, the two parts are characterized separately using Y-parameters, which are created as response surfaces in terms of the basic varying parameters in the circuit and EM parts. These parameters are modeled with Gaussian PDFs. Next, the two parts are combined, and the terminal quantities of interest are computed using these Y-parameters. Thus, the eventual objective functions or performance metrics are captured in terms of Gaussian random variables, which facilitates a rapid Response Surface Monte Carlo (RSMC) analysis to obtain the desired PDFs. It is then possible to calculate yield measures based on criteria for multiple objective functions (i.e., for performance metrics such as the gain of an amplifier).

An automated flow has been developed to do the statistical analysis on different performance parameters of an LNA. It has been shown that the inclusion of statistical variability in the EM objects is important for accurately capturing PDFs of the final performance measures.

More specifically, an exemplary method is employed for determining a PDF of at least one performance metric in regard to an EM component of an electronic device or system that includes the step of providing variability information as an input to a simulation of the EM component, for each randomly varying parameter to be considered in determining the PDF for the at least one performance metric. The variability information for each randomly varying parameter includes a range and a nominal value for the randomly varying parameter. For all of the randomly varying parameters to be considered, the simulation is used to generate a response surface. The response surface is defined over a statistical range for the randomly varying parameter, and as a function of a related variable on which the performance metric is dependent. Using a random vector generator, probabilities are produced so that the randomly varying parameter will be within each of a plurality of different incremental portions of the range that was provided. The random vector generator employs a correlation matrix that correlates values of the randomly varying parameter with the related variable. The related variable is extracted from the response surface, based upon the probabilities of the randomly varying parameter. The PDF for each performance metric evaluated in regard to the EM component is then determined, as a function of the probabilities of each randomly varying parameter, relative to the related variable.

The step of using the simulation to generate the response surface in the exemplary method includes the step of using a field solver to compute the related variable at terminals of each EM component. The field solver carries out a plurality of steps, including decomposing each EM component into an equivalent set of interior and exterior regions, where each interior region has a bounding surface, computing scattering due to each EM component using equivalent electric and magnetic surface currents, and solving for the electric and magnetic surface currents using the Method of Moments. This approach enables the response surface to be produced in regard to the related variable.

In this exemplary method, the at least one performance metric further depends on at least one randomly varying process parameter of a circuit comprising the electronic device or system. The method further includes the step of providing variability information for each randomly varying process parameter of the circuit, a list of the randomly varying process parameters for the circuit, and a netlist that describes a connectivity of the circuit, as an input to a general purpose circuit simulation program. The variability information for each randomly varying process parameter comprises a range and a nominal value for the randomly varying process parameter. For each of the randomly varying process parameters of the circuit to be considered, the general purpose simulation program is then used to generate a response surface. The response surface is defined over a statistical range for the randomly varying process parameter, and as a function of a related circuit variable on which the performance metric is dependent. The random vector generator is used to produce probabilities that each randomly varying process parameter will be within each of a plurality of different incremental portions of the range provided for the randomly varying process parameter and employs a correlation matrix that correlates values of the randomly varying process parameter with the related circuit variable for ports of an EM component. The related circuit variable is extracted from the response surface, based upon the probabilities of the randomly varying parameter. Each related circuit variable and each related variable for the EM component are then merged, and the PDF of the at least one performance metric for the electronic device or system is determined as a function of each related circuit variable and each related variable that have been merged.

In this exemplary method, the general purpose circuit simulation program comprises a Simulation Program for Integrated Circuits Emphasis (SPICE) software program. This method can further include the step of transforming a large number of possibly correlated related circuit variables into a smaller number of uncorrelated related circuit variables, for the circuit.

Also included in the exemplary method is the step of transforming a large number of possibly correlated related variables into a smaller number of uncorrelated related variables for one or more EM components. The method may include the step of determining each point where the EM component connects to the circuit, each such point comprising a port for the EM component.

In this method, at least one performance metric can be determined based upon at least one randomly varying parameter that is non-Gaussian and numerical. In addition, the step of determining the PDF for each performance metric can employ randomly varying parameters and randomly varying process parameters that are Gaussian and either correlated or uncorrelated and the PDF for the at least one performance metric is determined without an intermediate step of determining non-Gaussian PDFs for any randomly varying process parameter or randomly varying parameter.

Another aspect of the present novel approach is directed to a system for determining a probability density function (PDF) of at least one performance metric in regard to an electromagnetic (EM) component of an electronic device or system. The system includes a memory for storing machine executable instructions, and variability information for each randomly varying parameter to be considered in determining the PDF for the at least one performance metric. The variability information for each randomly varying parameter comprises a range and a nominal value for the randomly varying parameter. The system also includes an output device for presenting the PDF of the at least one performance metric to a user, and a processor that is coupled to the memory and the output device. The processor executes the machine executable instructions to carry out a plurality of functions that are generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
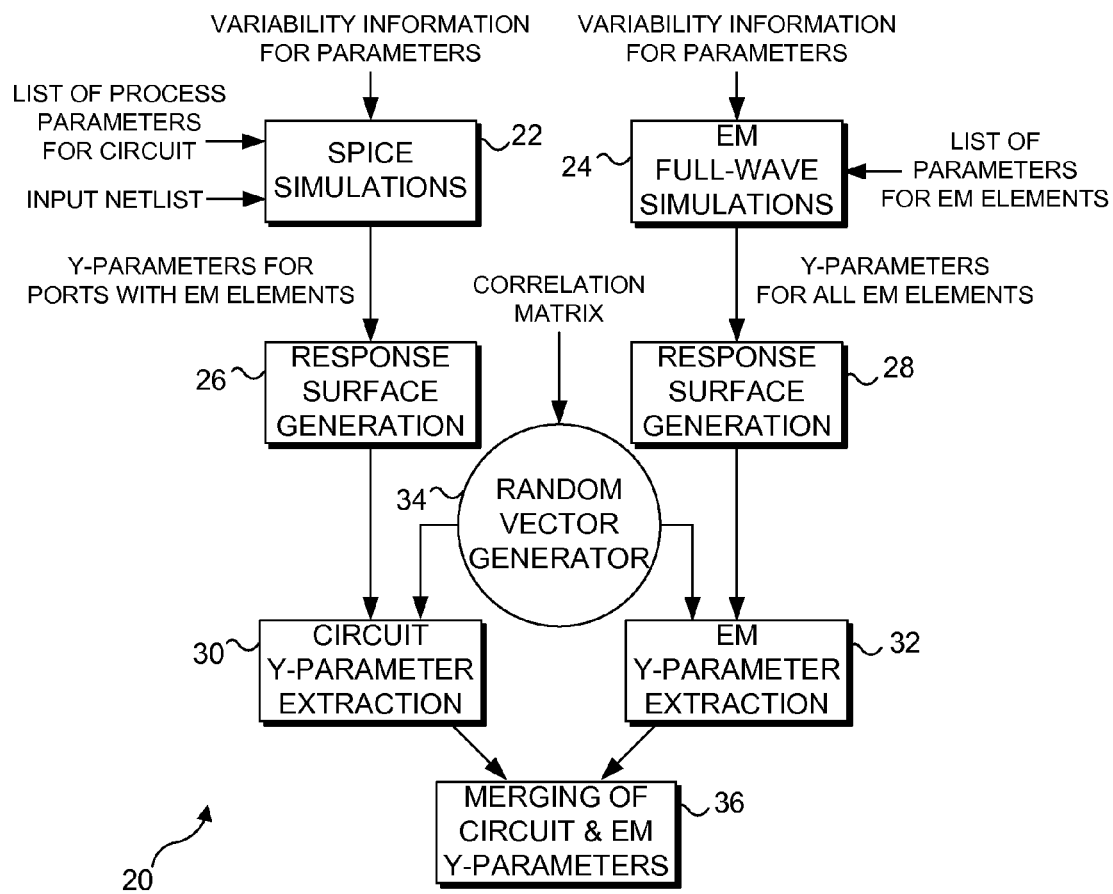
FIG. 1 is a flow chart illustrating the high level steps implemented in an exemplary embodiment of the present novel approach for extracting PDFs for performance metrics of an electronic device or system.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

General Overview

An exemplary flowchart 20 for an entire methodology used in the present approach is summarized in FIG. 1. The sources of variation in the circuit part and electromagnetic (EM) objects or components are identified a priori. A step 22 invokes a SPICE-like circuit simulator for measuring circuit performance, of the circuit portion of an electronic device or system. A step 24 conducts full-wave EM simulations for EM objects comprising the electronic device or system, using variability information for relevant parameters that are input in a list, such as a nominal value, a minimum value, and a maximum value for each parameter in the list. Steps 22 and 24 can be run concurrently at the points given by the variability information for the parameter list that is input to the process. Steps 26 and 28 are alike, in the sense that they generate response surfaces for Y-parameters (i.e., admittance), though the former deals with circuit Y-parameters, and the latter with EM Y-parameters. Steps 30 and 32 compute each of the Y-parameters required for rapid RSMC analysis, based upon the response surfaces generated for each of the parameters. A final step 36 uses a random vector generator 34, which is provided with a correlation matrix, to compute the objective functions or performance metrics, e.g., the gain of an amplifier, by merging the Y-parameters from the circuit and from the EM components.

PMCHWT-Based Field Solver

Any EM field solver that can model fields on surfaces may be used to obtain Y-parameters for EM objects. PPMCHWT is the field solver of choice in this exemplary approach. The PMCHWT formulation (so named after the original contributors Pogio-Miller-Chang-Harrington-Wu-Tsai) decomposes the original problem into an equivalent set of interior and exterior problems. The scattering due to each object can thus be computed in terms of equivalent electric and magnetic surface current densities. This formulation provides the advantage of analyzing finite-sized dielectrics with a surface-only based integral equation technique. This field solver is used for the examples discussed below; however, in practice, it is again emphasized that any field solver capable of computing terminal Y-parameters (or equivalently, S-parameters for conductance) can instead be used. The following discussion provides some background about the theory behind the formulation and implementation of the PMCHWT-based field solver.

The cornerstone behind the PMCHWT method is the surface equivalence principle, which is a mathematical model that enables the replacement of a homogeneous volumetric material region by its bounding surface. The electromagnetic effects are captured by including equivalent electric and magnetic surface currents. These currents are solved for by the Method of Moments.

The tangential components of the "real" electric and magnetic fields have to be continuous across the boundary surface. In a region characterized by permeability $\in$ and permeability $\mu$, the scattered electric and magnetic fields are given by $$A(r) = \frac{\mu}{4\pi} \int_{S'} G(r, r') J(r') ds' \qquad (1a)$$

$$H^{scat} = \frac{1}{\mu} \nabla \times A - j\omega F - \nabla \psi \qquad (1b)$$

where A, F, $\phi$, $\psi$ are the magnetic vector, the electric vector, the magnetic scalar, and the electric scalar potentials, respectively. These are given by $$A(r) = \frac{\mu}{4\pi} \int_{S'} G(r, r') J(r') ds' \qquad (2a)$$

$$F(r) = \frac{\varepsilon}{4\pi} \int_{S'} G(r, r') M(r') ds' \qquad (2b)$$

$$\phi(r) = \frac{\mu}{4\pi\varepsilon} \int_{S'} G(r, r') \rho(r') ds' \qquad (2c)$$

$$\psi(r) = \frac{\mu}{4\pi\mu} \int_{S'} G(r, r') \zeta(r') ds' \qquad (2d)$$

where r, r' are the observation and source points, S' is the source region and $\rho$, $\zeta$ are the equivalent electric and magnetic charge densities obtained by continuity equations $$\nabla \cdot J + j\omega\rho = 0 \qquad (3a)$$

$$\nabla \cdot M + j\omega\zeta = 0 \quad \nabla \cdot J + j\omega\rho = 0. \qquad (3b)$$

G(r,r') is the 3D full wave Green's function in the region where the scattered fields are computed, given by $$G(r, r') = \frac{e^{-j\omega\rho|r-r'|}}{|r-r'|}. \qquad (4)$$

Lossy materials can be easily handled by setting $$\varepsilon = \varepsilon_0 \varepsilon_r \left(1 + \frac{\sigma}{j\omega\varepsilon_0}\right),$$

where $\in$, $\in_0$ and $\sigma$ are the free space permittivity, relative permittivity of the material, and conductivity of the material, respectively. The wave number will then be $$k = \omega \sqrt{\left(\mu\varepsilon_0\left(1 + \frac{\sigma}{j\omega\varepsilon_0}\right)\right)}.$$

The quantity $|r-r'|$ denotes the distance between the source and observer points.

The continuity of the tangential fields along with the Equations (1a) and (1b) comprise the governing equations of the PMCHWT formulation. Triangular elements, which are very popular in computational EM owing to their ability to model the surface of arbitrarily shaped 3D objects, are used to discretize the individual objects or components. The equivalent electric and magnetic current densities are expressed as linear combinations of the popular Rao-Wilton-Glisson (RWG) basis functions defined over triangle pairs. To solve for the unknown coefficients, a Galerkin testing procedure was adopted in this exemplary embodiment, which results in a matrix equation of the form Zi=v, where Z represents the impedance matrix, i represents the vector of unknown coefficients for the current density and v represents the excitation vector. When the frequency is sufficiently high that the metal thickness and width are greater than two skin depths, the lossy metal part can be accurately modeled using an equivalent surface impedance. The LU decomposition of the resulting matrix is obtained using a parallel LU algorithm, implemented on a cluster of 16 nodes. The excitation is introduced in the form of delta-gap sources, which are defined around specific RWG edges. Solving for the port currents will directly give the Y-parameters of the device, while taking into account all the electromagnetic effects.

The Statistical Analysis Methodology

The present approach yields objective functions or performance metrics for coupled circuit-EM systems in terms of independent or correlated random variables whose PDFs are either Gaussian or non-Gaussian. This strategy leverages the ability to carry out rapid response surface Monte Carlo analysis on the desired objective functions or performance metrics to facilitate the computation of the necessary PDF, Cumulative Density Function (CDF), enabling the corresponding yield of an electronic device or system to be determined. Radio frequency (RF) circuits have been analyzed by circuit simulators like SPICE using RLC models for the passive components such as inductors. These could be obtained from field solver solutions like S-parameters by optimization. PDFs of these RLC values could be constructed by applying variations to the field solver models, and these could be incorporated into the circuit simulators. This conventional approach would require a relatively large number of optimization runs to be done to extract the equivalent RLCs, and more importantly, the resulting PDFs are only numerical, may not be Gaussian, and will most often be correlated. Generating random samples that correspond to PDFs, which are non-Gaussian and correlated and known only numerically would be a very difficult proposition.

The following proposed novel approach thus provides several advantages over the conventional approach for evaluating performance metrics relative to PDFs. In this exemplary method, the coupled circuit-EM system is decoupled at the points where the EM objects connect to the circuit portion. Suppose N EM objects connect to a circuit to form an overall circuit-EM system. Then, it is useful to define circuit ports at the locations where the EM objects connect to the circuit part. Each of these EM objects could be characterized as a 1, 2, or multiport device whose behavior is characterized by means of a field solver.

Figure 3:
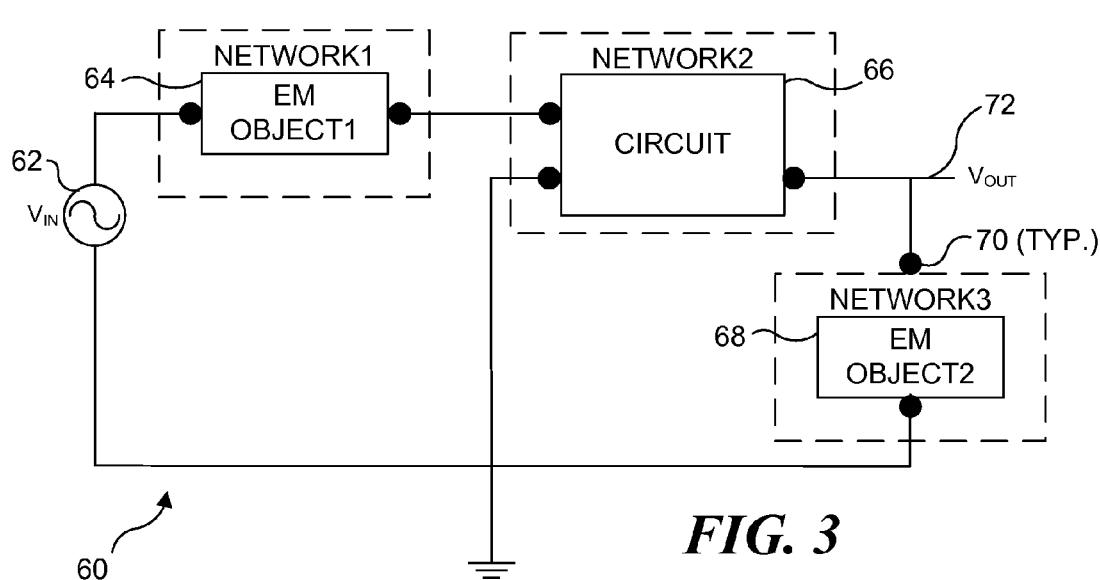
FIG. 3 is a schematic diagram illustrating an exemplary scheme for decoupling EM objects and a circuit part of a simple electronic device.

A typical example of an electronic device 60 that includes two-port EM objects 64 and 68, and a circuit portion 66 is shown in FIG. 3, each including two ports, such as a port 70. A voltage source 62 provides a sinusoidal input voltage, $v_{in}$ and the electronic device produces an output voltage, $v_{out}$ on a line 72. Further, it is generally assumed that the circuit portion being evaluated can be linearized around the operating point and hence, its behavior can be captured by means of N-port network parameters. Y-parameters are used for both EM objects and the circuit parts in this exemplary approach, although it will be understood that other network parameters can instead be used.

Determination of Response Surface and Statistics of EM Part of Device

Figure 2:
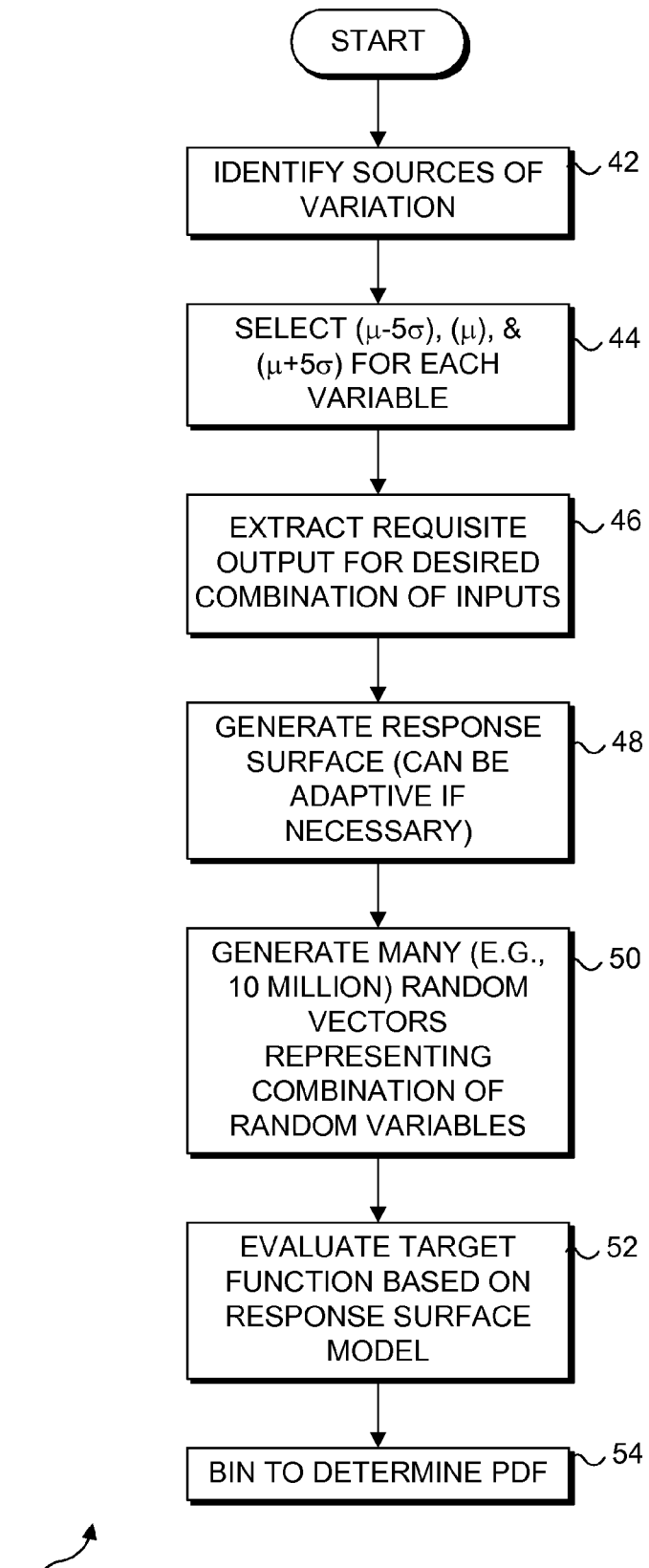
FIG. 2 is a flow chart illustrating exemplary steps implemented to determine the PDFs for inductance and quality factor for an on-chip inductor, which is one type of EM component.

The following discussion explains specific exemplary steps that are implemented to determine the response surface and statistics for an EM part of an electronic device, such as electronic device 60, in FIG. 3. These steps are set forth in a flow chart 40, shown in FIG. 2, as follows. A step 42 provides for identifying the sources of variation contributing to the statistical nature of the properties of the EM object. These sources can be geometry-based or electrical-based in nature. Examples of geometry-based variations include the width, thickness of conductors, thickness of dielectrics, spacing between conductors, etc. Examples of electrical properties that vary include the conductivity of the dielectrics, permittivity of the dielectrics, permeability of magnetic materials, etc. These sources of variation have a Gaussian distribution for the PDF and thus, the two parameters, mean and variance have to be supplied. Also, if they can be correlated, a correlation matrix has to be specified, while if they are independent, correlation information is not necessary. In this specific example, statistics on the R, L, and Q values of an inductor are to be extracted. The parameters that are statistically varying are the inductor track width, the substrate conductivity, and the oxide thickness.

As indicated in a step 44, once the parameters, their means, and variances are known, three levels are fixed for each variable. These levels that are selected correspond to $(\mu-\alpha\sigma)$, $(\mu)$ and $(\mu+\alpha\sigma)$ where $\mu$ is the mean, $\sigma$ is the variance and $\alpha$ is a number between 3 and 5. In step 44 of FIG. 2, the value 5 is used for $\alpha$. In a step 46, all possible combinations of three levels of each parameter are made, and each of these combinations is input into a full wave electromagnetic simulator. If there are "N" variables and "m" possible levels for each of the variables, then there will be $m^N$ possible combinations. Simulations are done for each of these combinations, and the desired output quantity is obtained for each of the simulations. For large values of m and N (typically m>4 and N>4), Design of Experiments (DoE) (a well known technique in statistical analysis) can be employed in order to reduce the number of simulations. However for EM structures, the number of variables that are statistically varying are typically small, and for statistics, three levels per variable are typically sufficient. Accordingly, the use of DoE will not often be necessary.

After the simulation data are collected, in a step 48, a response surface is created for the output quantities desired. However, experience has shown that it is good to construct the response surface for magnitude and phase of the Y-parameters, and then derive the output quantities from them, rather than creating the response surface for the output quantities directly, since this approach will reduce the error. The output quantities can, in general, be any quantity that can be extracted from EM simulations, such as current density, port parameters, as well as circuit equivalent parameters, such as resistance, capacitance, inductance, quality factor, fields, and many more.

The response surfaces sufficient for statistical analysis include:

a. Linear $$y = a_0 + \sum_{i=1}^{N} a_i x_i$$

b. $2^{nd}$ order $$y = a_0 + \sum_{i=1}^{N} a_i x_i + \sum_{i=1}^{N} b_i x_i^2 + \sum_{i=1}^{N} \sum_{j=i+1}^{N} c_{ij} x_i x_j$$

Or more compactly, as shown in the following $$y = a_0 + a^T x + x^T B x.$$

Coefficients are determined by the following procedure for a linear response surface $$A = (X^T X)^{-1} X^T v$$

where A is the matrix of coefficients, X is the matrix of size $m \times (n+1)$, where the first column is all ones and the remaining entries are formed from the values of $x_i$ for those observations. The vector v comprises the observed values of the output quantities. The $2^{nd}$ order response surface is constructed similarly by introducing new variables for the square and the cross terms.

Figure 15:
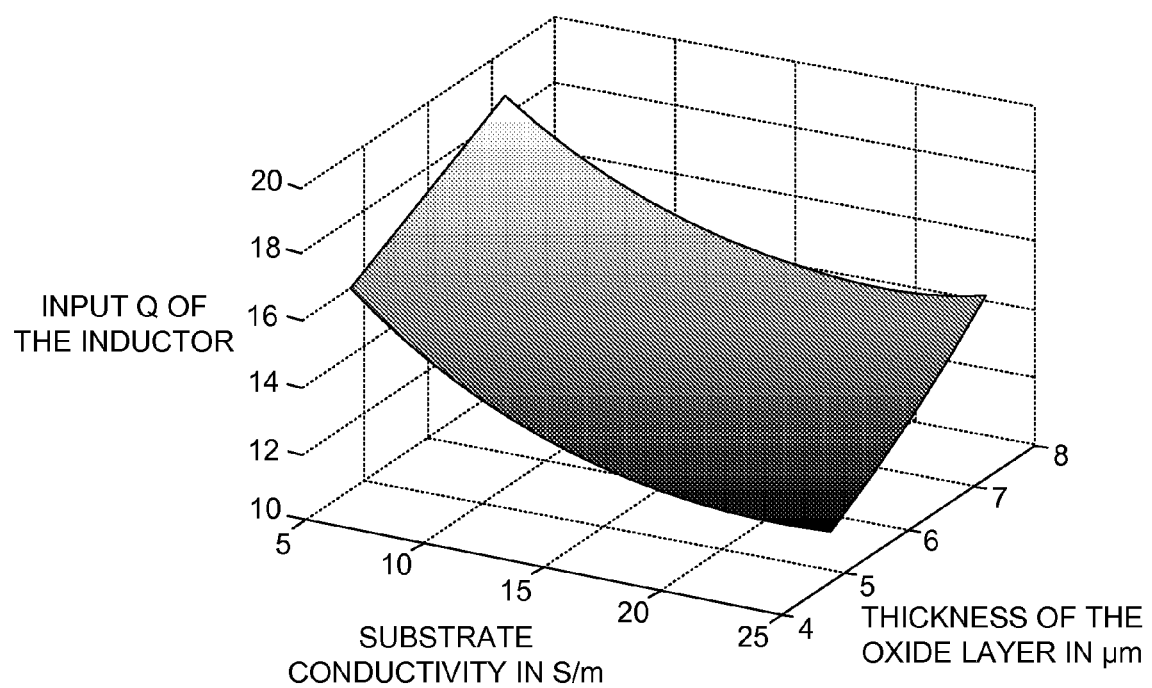
FIG. 15 illustrates an exemplary response curve for a performance metric Q of an inductor with two variables, including oxide thickness, and substrate conductivity.

An exemplary response surface for the Q of an inductor with two variables, oxide thickness and substrate conductivity is shown in FIG. 15.

After the response surface is generated, a step 50 provides for generating a large number of random vectors for the variables. A step 52 provides for evaluating the target function based on the response surface, i.e., using the random vectors to evaluate the output quantities as if running a large number of simulations (which would otherwise require a prohibitively long time). In a step 54, the output quantities are finely binned (i.e., by creating a histogram with fine increments for each bin), which effectively simulates a continuous PDF for the performance metric.

Statistics on Coupled Circuit-EM Systems Through Response Surface of Y-Parameters In isolation, the variation in any circuit performance can be attributed to variations in process parameters. For example, for Metal Oxide Semiconductor Field Effect Transistors (MOSFETs), these random variables can include gate oxide thickness, flat-band voltage, and channel length and width. Circuits can contain millions of transistors or MOSFET devices. The process related variations, in turn, produce variations in the electrical parameters of MOSFETs and other components, such as threshold voltage, carrier mobility, etc.

In connection with the present approach, the variability analysis of standalone circuit performance is categorically explained below as a sequence of steps, which are generally shown in a flowchart 20 in FIG. 1. SPICE-like circuit simulators (as indicated in a block 22 of FIG. 1) can simulate large circuits that contain active devices, such as MOSFETs. The measured process and electrical parameters for a given CMOS technology (which is used to fabricate MOSFET devices) are provided in one or more model files. Model files can also be used to distinguish between n-type and p-type MOSFET devices. The model files for a specific CMOS technology can, for example, be obtained from the public domain web site for MOSIS, as will be well known to those of ordinary skill in this technology. It can be assumed that the model files obtained through MOSIS comprise the mean values of the process and electrical parameters. The parameters in the model file that undergo variation can be assumed to have PDFs that are normally distributed, i.e., Gaussian in nature. If the variable $\mu$ denotes the mean value for a parameter that varies, and $\sigma$ denotes the standard deviation for that parameter, then as explained above in regard to EM components, the parameter can be assumed to vary between $\mu+\alpha\sigma$ and $\mu-\alpha\sigma$, where $\alpha$ denotes an integer in the range of 3 to 5. It is noteworthy to mention that the standard deviations encountered govern the interpolation ranges. Since extrapolated values obtained using the interpolated response surface formulae are known to be inaccurate, the above interpolation range is chosen in order to ensure that almost no random sample falls outside this range, which guarantees accuracy of the aforementioned PDFs. For SPICE simulations, the input netlist for the circuit needs to be provided, along with a list of ports for extracting circuit Y-parameters. If the user defines N such ports, N-port Y-parameters of the circuit will be extracted. The other critical information that the user provides is the list of parameters, both process and electrical, which need to be varied over the predefined ranges mentioned above. The set of values that any parameter can assume in this range also needs to be selected by the user. Correlation information between various parameters in the model files must further be provided by the user. These inputs to the SPICE-like simulation are clearly shown in FIG. 1.

Response surface generation is carried out in a step 26 for individual Y-parameters of the circuit by means of a three-level full-factorial design. Second order response surfaces are utilized in this approach. The levels selected in the example are $\mu-5\sigma$, $\mu$, and $\mu+5\sigma$. For an N-port circuit, the entire set of Y-parameters is characterized by individual response surfaces. Moreover, since the Y-parameters are themselves complex quantities, separate response surfaces are generated for the magnitude and phase of the individual Y-parameters.

As outlined above in connection with the steps for handling the EM component (FIG. 2), using a field solver, the Y-parameters (usually one port or two port, but in general, any number of ports) of the EM-objects or components of a combined circuit/EM device are computed in a step 30 for all possible combinations of the three levels ($\mu-5\sigma$, $\mu$, $\mu+5\sigma$) of all the varying parameters, and the response surfaces for the magnitude and phase of each of the Y-parameters of the EM objects are determined, in steps 24, 28, and 32.

Connecting the EM objects back to the circuit ports leads to constraint equations that must be obeyed. Using the constraint equations and the Y-parameter equations, the final output variables of the coupled circuit-EM system can be determined in terms of the individual Y-parameters. The final output variables can include terminal quantities such as input/output impedance, gain, phase margin, transfer impedances, distortion, etc., as indicated in a step 36.

This approach is illustrated in FIG. 3 for electronic device 60, which includes circuit part 66, connected to EM-objects 64 and 68. For this example, assume that the final desired output variable is the voltage gain, which is the ratio of $v_{out}$ to $v_{in}$. In this example, the two EM objects are respectively represented as one-port impedances $Z_1$ and $Z_2$, which are obtained from the full wave EM solver, where $$Z_1 = \frac{1}{Y_{1EM}} \text{ and } Z2 = \frac{1}{Y_{2EM}}.$$

The governing equations for the two-port circuit are:

$$i_1 = y_{11}v_1 + y_{12}v_2$$

$$i_2 = y_{21}v_1 + y_{22}v_2$$

However, the impedance constraints for the EM objects have to be met, giving:

$$V_{in} = i_1 Z_1 + v_1$$

$$V_2 = -i_2 Z_2$$

$$V_{out} = v_2$$

Thus, the eventual output variable, gain G, can be expressed as:

$$G = \frac{Y_{1EM} y_{21}}{y_{12} y_{21} - (y_{11} + Y_{1EM})(y_{22} + Y_{2EM})}.$$

Next, random samples of the underlying variables for both circuit and EM parts are generated according to the distributions (independent Gaussian, independent non-Gaussian, and correlated Gaussian). The Y-parameters of the circuit and the EM components are evaluated, and the final objective performance metrics, such as G, are evaluated. Using a random vector generator 34, these steps are repeated for a large number of random samples (but each time, evaluating the final output from only the response surface, which is very fast to implement), and the results are finely binned, to approximate the continuous PDF of the final desired output variables.

The random variables representing the sources of variation for EM objects and circuits can overlap. When this happens, it is necessary to account for the overlap while constructing the response surface; the common variables must have the same ranges for both field solver and circuit simulations. Further, it is not necessary that all the variables be independent. Given the co-variance matrix, it is possible to generate vectors of correlated Gaussian random variables through a Cholesky decomposition of the correlation matrix. However, the important point to note is that principal component analysis (if used to transform a large number of possibly correlated random variables into a smaller number of uncorrelated variables) and response surface generation must be done on the EM objects and the circuits separately, as illustrated in FIG. 1.

The response surfaces for the Y-parameters of the EM objects are constructed in terms of the corresponding geometry parameters and electrical properties. Similarly, for the circuit part, the Y-parameters for the N-port system with all the EM objects removed is considered, and the response surface is built for all the port Y-parameters. Once this is done, the two portions are combined by merging the decoupled parts. A simple network analysis will then yield performance measures, such as gain, input/output impedance, and input reflection coefficient. These concepts are further illustrated below in the discussion of an exemplary Low Noise Amplifier (LNA).

Statistical Performance Analysis of Spiral Inductors

This section focuses on the statistical study of on-chip spiral inductor performance, which is an excellent example to show the application of the present invention to an EM object. While a more important aspect of the present approach is its applicability in determining the PDF for performance metrics of combined circuit/EM parts of an electronic device or system, it must also be emphasized that the present approach enables statistical evaluation of only EM objects, which has not generally been done in the prior art. Spiral inductors represent a good choice for an exemplary EM object to explain this approach, because they are used in many critical electronic devices or systems, such as LNAs, delay lines, VCOs, and transformers. Since analog/RF technologies are migrating to 90 nm and smaller fabrication, process variations directly impact spiral inductor performance. Variable inductor parameters that can be optimized for an inductor include geometrical parameters whose effects can be studied very well with field solvers. Another parameter of significance is the substrate conductivity. CMOS grade silicon has bulk conductivity that is quite high but variable. When interconnect-based structures like spirals are built on doped silicon, the local doping density varies randomly, and hence, the conductivity also varies. Thus, it becomes essential to model the substrate conductivity variations accurately, since the quality factor Q is heavily impacted by substrate conductivity. In addition, lithography and Design for Manufacturing (DFM) constraints are driving geometries to become more prone to large variations as feature sizes become smaller. In this example, three independent variables are selected for the statistical analysis of spiral inductors. These three random variables are: the track width of the highest metal layer in which the inductor is fabricated, the oxide thickness, and the substrate conductivity.

Figure 4:
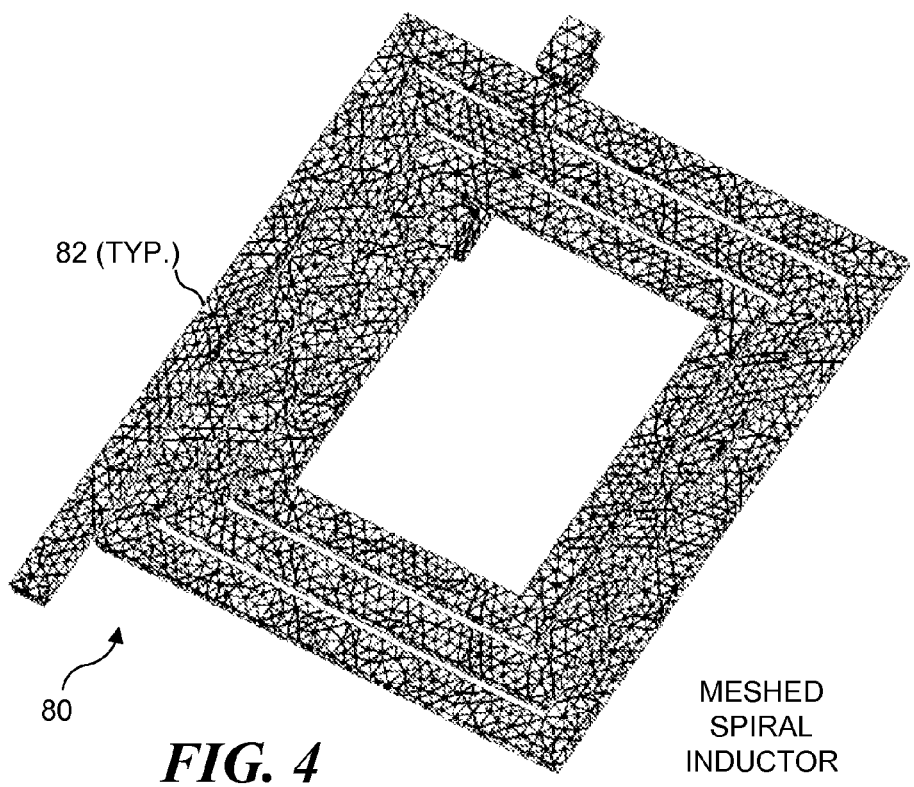
FIG. 4 is an exemplary spiral inductor illustrating a triangular mesh for use in implementing the surface integral equation field solver.

A 3.5 turn square spiral inductor is designed to produce an inductance of 1.3 nH with an outer diameter of 100 μm, nominal track width (w) of 5 μm, nominal track spacing of 2.5 μm, in an RF CMOS process. The frequency of operation of the inductor is 15.78 GHz. The inductor geometry is shown in FIG. 4, which also illustrates the triangular mesh that is used in developing this approach.

A three-variable full factorial design is made to obtain the response surface. The track width varies as {3.75, 5, 6.25} μm. The overall oxide thickness will be the sum of the six individual oxide thicknesses used in the process. If $T_{ox_i}$ represents the oxide thickness of the $i^{th}$ layer, and $T_{ox}$ represents the overall thickness, then $T_{ox} = \Sigma_{i=1}^{i=6} T_{ox_i}$. Further, if each of these oxide thicknesses is a Gaussian random variable with mean $\mu T_{ox_i}$ and standard deviation $\sigma_{T_{ox_i}}$, the overall oxide thickness will also be a Gaussian random variable with mean $\Sigma_{i=1}^{i=6} \mu T_{ox_i}$ and standard deviation $$\sqrt{\sum_{i=1}^{i=6} \sigma_{T_{ox_i}}^2},$$

assuming independence. For the process used, the three levels of oxide thickness are taken to be {4.8, 6, 7.2} μm. Finally the substrate conductivity values for the design are taken to be {5, 15, 25} S/m. It should be noted that the three levels of the design are taken to be ($\mu$–$5\sigma_{max}$), ($\mu$), and ($\mu$+$5\sigma_{max}$). The standard deviations encountered decide interpolation ranges. Since extrapolated values obtained using the interpolated response surface formulae are known to be inaccurate, it is expedient to model the interpolations from ($\mu$–$5\sigma$) to ($\mu$+$5\sigma$) so that almost no random sample falls outside the interpolation range, thereby generating accurate PDFs. The response surfaces for all the 2-port Y-parameters for the inductor are built using the results from the field solver simulations of the inductor with these geometry and substrate parameter values. An important point to note here is that building the response surface for the real and imaginary parts of the Y-parameters results in an average error of about 5% while building the response surface for the smoothly varying magnitude and phase of the Y-parameters results in an average error of less than 0.4% and a maximum error less than 0.85%.

An error analysis is performed on the first and second order response surface models to test the goodness of fit. Results are furnished for a set of four parameters, which include a mix of sensitive and non-sensitive parameters. It can be seen from Table I that the error values are significantly less for the second order response surface model.

TABLE I

ERROR ANALYSIS FOR FIRST AND SECOND ORDER RESPONSE SURFACES

| Sample | $1^{st}$ order | | $2^{nd}$ Order |
|---|---|---|---|
| Function | Avg. error | Max. error | Max. error |
| $|Y_{12}|$ | 0.68% | 2.13% | 0.82% |
| $|Y_{21}|$ | 0.69% | 2.10% | 0.73% |
| $\angle Y_{11}$ | 0.37% | 1.1% | 0.26% |
| $\angle Y_{12}$ | 0.2% | 0.68% | 0.13% |

Results are presented for the statistical analysis of the inductors alone. Performance measures selected are the inductance L, series resistance R, and the input quality factor Q. The definition of L and Q is as follows:

$$L = \frac{imag\left(\frac{1}{Y_{12}}\right)}{2\pi f} \quad (5a)$$

$$Q = -\frac{imag(Y_{11})}{real(Y_{11})} \quad (5b)$$

When an inductor has one port grounded, $Y_{11}$ is used for all the definitions. The response surfaces for all the Y-parameters are built, and the objective functions are described in terms of the definitions. A rapid RSMC analysis will furnish the required PDFs. Results for L, R, and Q for two types of variations are presented in FIGS. 5, 6, and 7 below.

Figure 5:
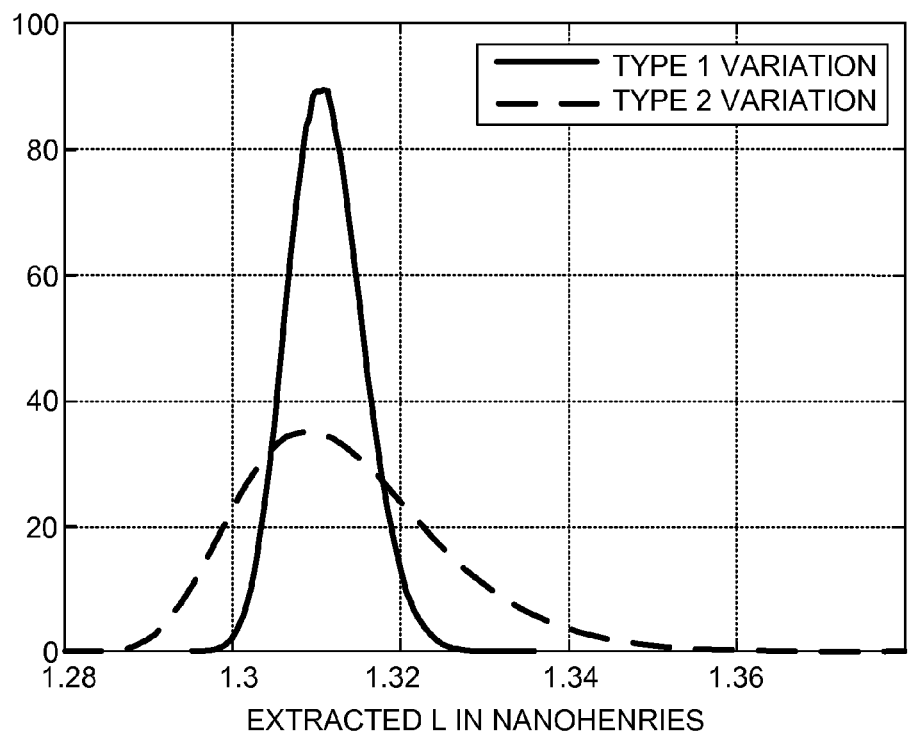
FIG. 5 is a graph showing the Type 1 and Type 2 PDFs for the L (inductance) for the inductor of FIG. 4, wherein Type 1 has standard deviations of 5% of the total range of variation considered for all the varying parameters, and Type 2 has standard deviation of 10% of the total range considered for all the varying parameters.
Figure 6:
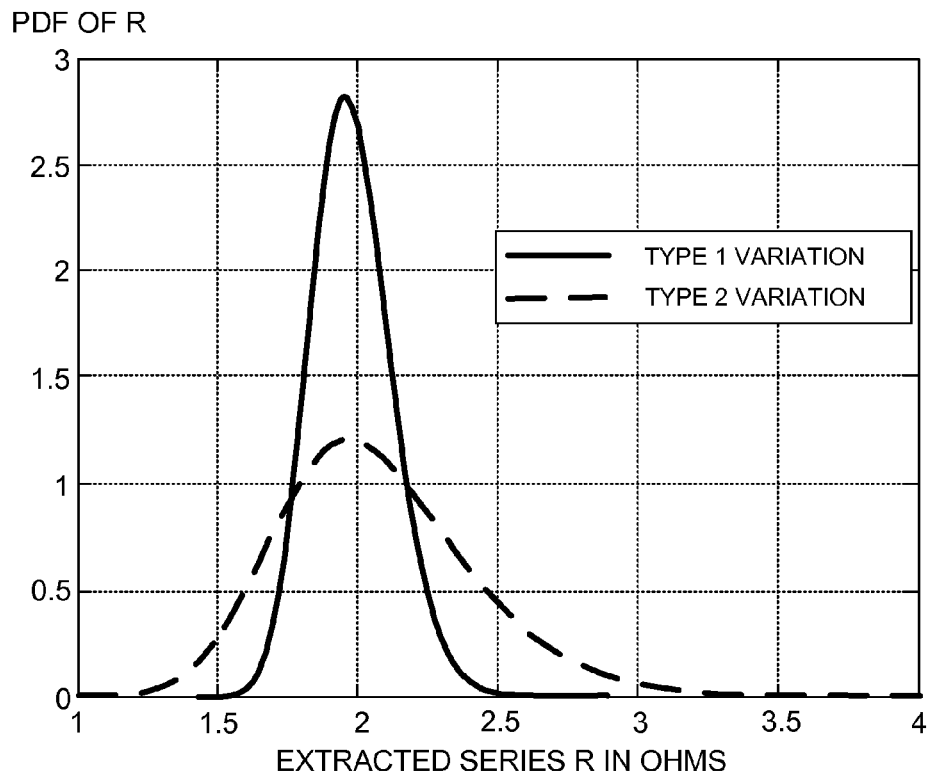
FIG. 6 is a graph showing the Types 1 and 2 PDFs for the R (resistance) of the inductor of FIG. 4.
Figure 7:
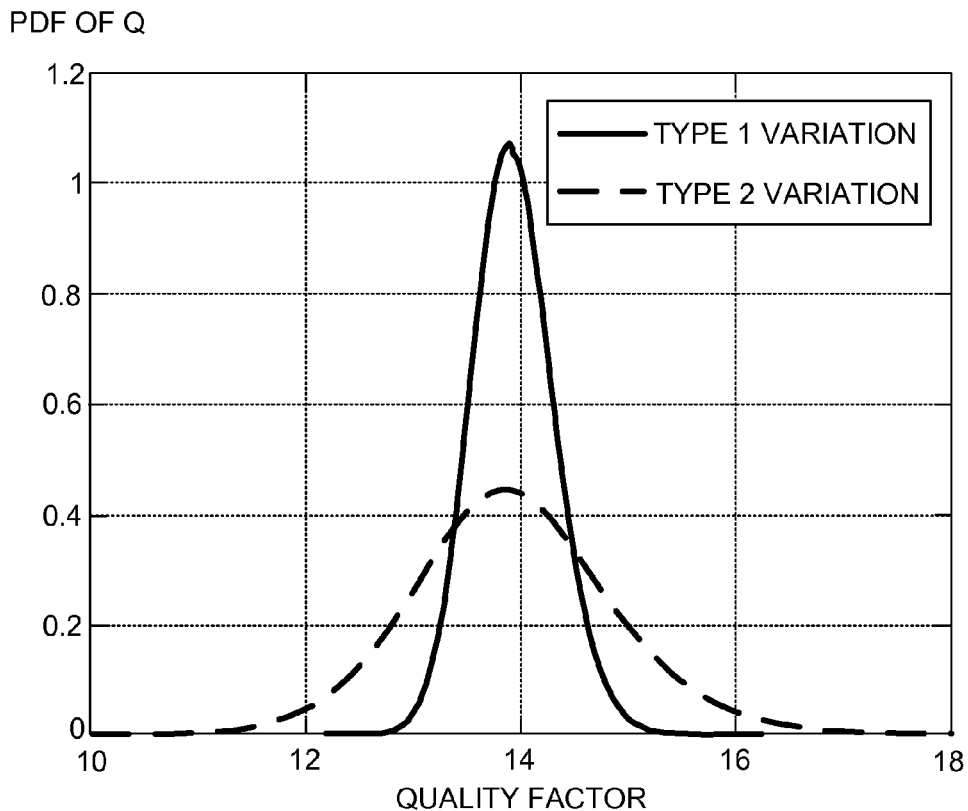
FIG. 7 is a graph showing the Types 1 and 2 PDFs for the Q (quality factor) for the inductor of FIG. 4.

In FIGS. 5, 6, and 7, the PDFs labeled Type 1 are for standard deviations of 5% of the total range of variation considered for all the varying parameters. The PDFs labeled Type 2 are for standard deviations of 10% of the total range considered for all of the varying parameters.

It is apparent that the resulting PDFs for the extracted inductance L and the series resistance R are non-Gaussian for larger variations. To confirm this, the skewness of the PDFs for L, R, and Q was calculated. The skewness of a PDF κ is defined as follows:

$$\kappa = \frac{E[(X-\mu)^3]}{\sigma^3}. \qquad (6)$$

For Gaussian PDF, the skewness is zero. For Type 1 variability, the skewness of L and R are 0.28 and 0.25, respectively, while for Type 2 variability, they are 0.55 and 0.48, respectively, showing the non-Gaussian nature of these PDFs. The correlation between them is found to be 0.1.

Figure 8A:
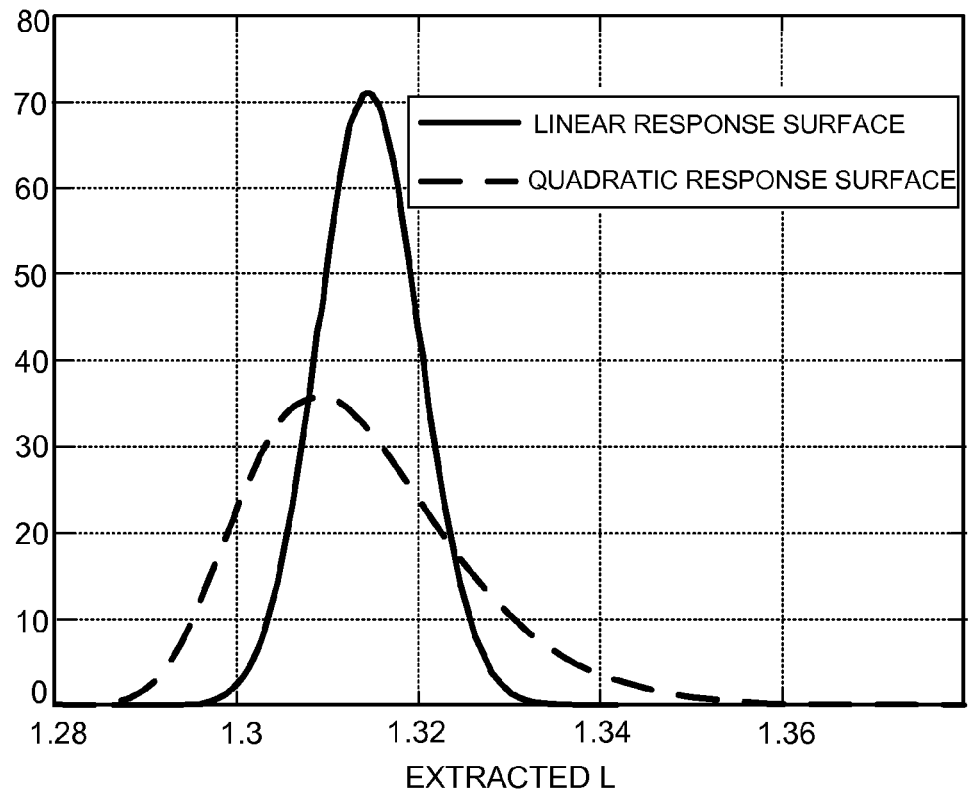
FIG. 8A illustrates the PDF for L for a linear response surface and for a quadratic response surface, for the inductor of FIG. 4.

The change in the PDF for the extracted series L (for Type 2 variation) from Gaussian to non-Gaussian due to second order modeling is shown in FIG. 8A, which is confirmed from the skewness values for the two PDFs. The first order model gives a skewness of 0.02, and the second order gives a skewness of 0.55 for the PDF of L. This result reinforces the assertion that for larger process variations, second order modeling which is more accurate, leads to non-Gaussian PDFs for the extracted equivalent circuit parameters of EM objects. The slight variations in the extreme values of L are attributable to the error incurred by the linear response surface model.

Figure 8B:
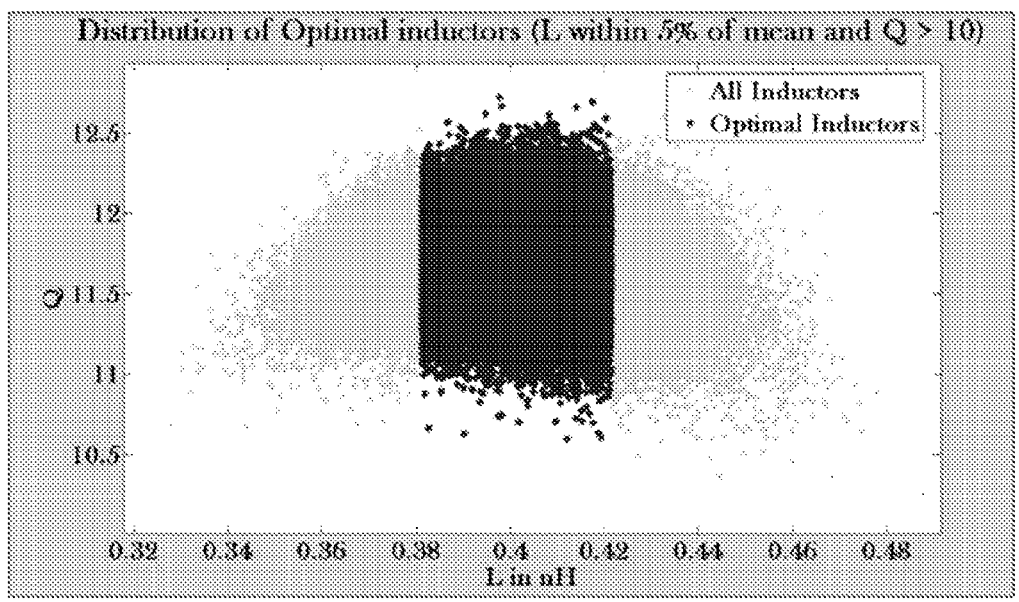
FIG. 8B is a graph illustrating an exemplary distribution of optimal inductors in the L-Q space.

FIG. 8B shows a scatter plot of (L, Q) for inductors, highlighting the optimal inductors for use in an electronic device, within the darker region, based on the present approach for statistical evaluation. The lighter gray region encompasses all inductors within the range variability specified for these parameters, but only those within the darker region would be optimal to achieve an acceptable L and Q.

Figure 9:
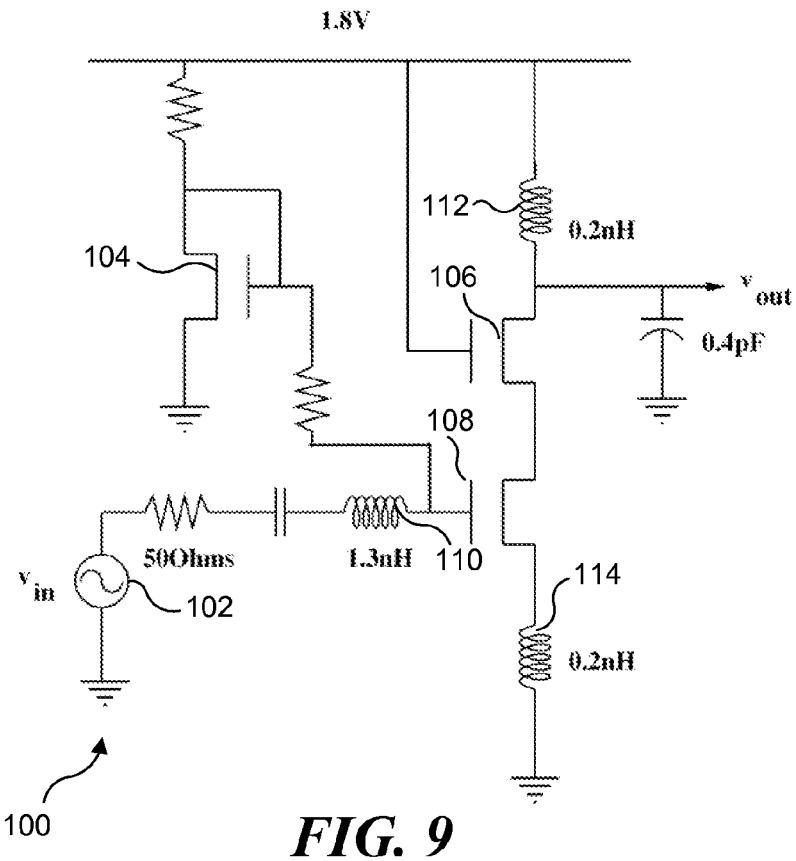
FIG. 9 is a schematic circuit for an exemplary low noise amplifier (LNA) that has three EM components (inductors), which serve to illustrate how the present approach is used to determine the PDFs for selected performance metrics of coupled circuit/EM parts of an electronic device.

Combined Circuit/EM Statistical Analysis Applied to Exemplary Low Noise Amplifier The proposed methodology has been applied to the statistical analysis of performance metrics of a Low Noise Amplifier (LNA). FIG. 9 includes a schematic that represents an LNA, which is indicated by a reference numeral 100, with an operating range extending from 15.33 GHz to 16.23 GHz, and with a center frequency ($f_c$) of 15.78 GHz. The voltage gain in the absence of parameter variations is 17 dB, the power consumption is 11 mW, and the cut-off frequency, $f_T$, is approximately 65 GHz. The minimum achievable noise figure is 1.92 dB. The single-ended LNA in FIG. 9 has been designed using an RF CMOS process in 0.18μ technology. LNA 100 responds to a voltage source 102 that produces an input voltage $v_{in}$. The LNA includes three MOSFET transistors 104, 106, and 108, three spiral inductors 110, 112, and 114, and various other components including resistors and capacitors. It should be noted that the dc resistance of the EM objects (spiral inductors, in this example) are different than their ac resistances due to the skin effect, which is evident at sufficiently high frequencies. For the operating point calculations in this example, the nominal dc resistances are used, and it was verified that the variability in dc resistance did not have any noticeable effect on the operating point. These dc resistance variables are automatically removed from the netlist during the high frequency Y-parameter calculations, since they are accounted for in the EM simulations through their Y-parameters.

Process Parameter Variations

For VLSI circuits, the spread in circuit performance depends on two categories of parameters. Process related parameters include gate oxide thickness, reduction in channel length, width reduction, and flat-band voltage. Circuit mismatches related to placement constitute the other set. In the following discussion of this exemplary application of the present approach to a LNA, random variations in gate oxide thickness, zero body-bias threshold voltage, and reduction in channel length have been taken into account. The dependence of zero body-bias threshold voltage on oxide thickness is captured using correlation between these BSIMv3 SPICE MOSFET model parameters. It is assumed that intra-die variations are not taken into account.

Performance Metrics of LNA

An automated flow has been developed to extract all the necessary Y-parameters of circuits that contain EM objects. The LNA circuit depicted in FIG. 9 is one such example. The circuit ports to which inductors connect become candidates for circuit Y-parameter measurement. A black box approach inherent in Y-parameter extraction, automatically encapsulates all the intrinsic parasitics of the Metal-Oxide Semiconductor (MOS) transistors. All circuit and EM simulations are performed at a single frequency of 15.78 GHz in this example.

Response surfaces are constructed for each of the Y-parameters by means of a three-level full factorial design, as in the case of the inductors discussed above. As before, the levels selected are $(\mu-5\sigma_{max})$, $(\mu)$, and $(\mu+5\sigma_{max})$. In this case, $5\sigma_{max}$ has been taken to be 25% of the mean value for each parameter. As mentioned above, the response surfaces are constructed for the magnitude and phase of the individual Y-parameters in order to minimize the error.

Each inductor may appear in one of two configurations in the input deck. The inductor may be ungrounded, or it may have one grounded terminal. The latter configuration facilitates replacement by an equivalent impedance for a more simplistic view of the network. The former configuration requires more detailed analysis and retention of two-port Y-parameters for the inductor.

Figure 10:
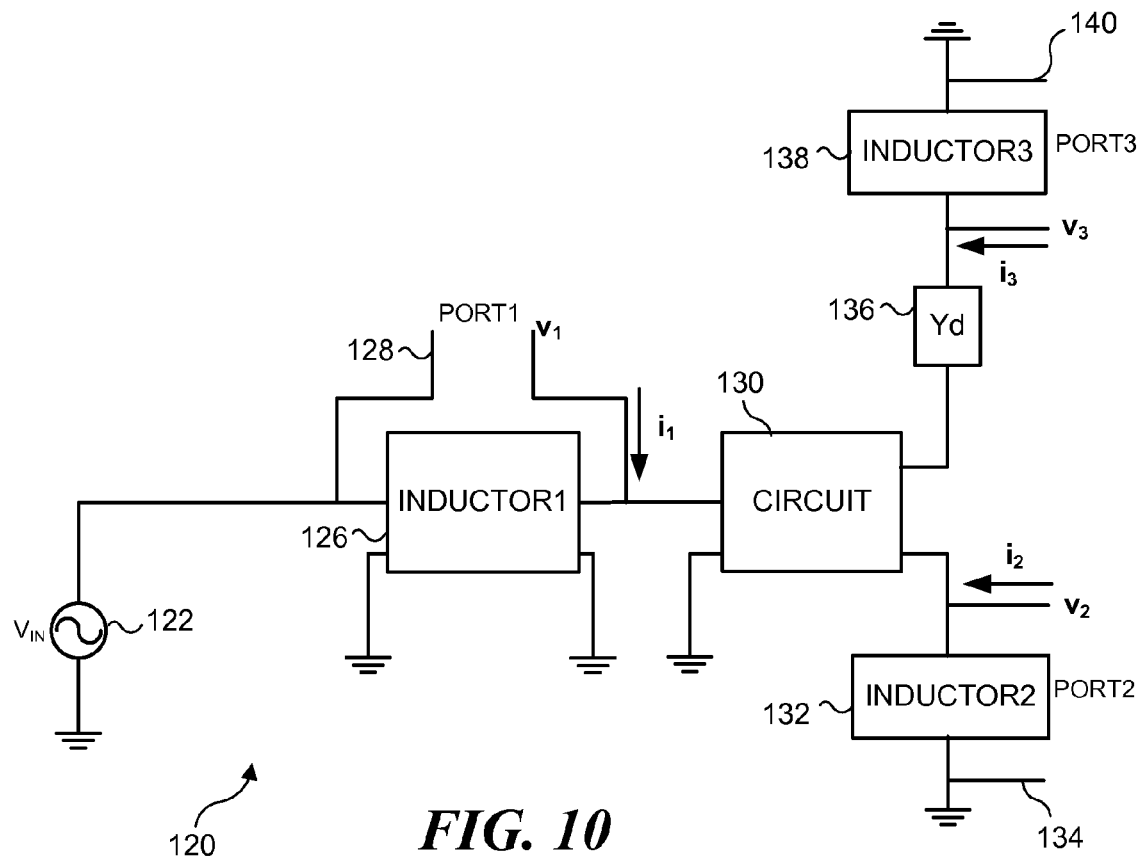
FIG. 10 is a block diagram that illustrates the Y-parameter port definition scheme used for the LNA of FIG. 9.

FIG. 10 includes a block diagram 120 that illustrates the interconnection between the circuit and three inductors for the aforementioned LNA circuit. There are four sets of Y-parameters, one set belonging to a circuit part 130 and the other three sets respectively belonging to each of the inductors, including a spiral inductor 126 (Inductor1), a spiral inductor 132 (Inductor2), and a spiral inductor 138 (Inductor3). Voltages appearing at ports 128 on Inductor1, 134 on Inductor2, and 140 on Inductor3 are respectively labeled $v_1$, $v_2$, and $v_3$ in the Figure. The corresponding port currents are represented as $i_1$, $i_2$, $i_3$ in the Figure. The circuit port definitions for LNA Y-parameter extraction are also depicted in FIG. 10. In keeping with the standard convention for Y-parameter labeling in terms of the ports with which they are associated, the entire set of circuit Y-parameters can be written as:

$$y_{11}{}^c, y_{12}{}^c, y_{13}{}^c, y_{21}{}^c, y_{22}{}^c, y_{23}{}^c, y_{31}{}^c, y_{32}{}^c, y_{33}{}^c$$

The three inductors in FIG. 10, which are labeled Inductor1, Inductor2, and Inductor3, have the following two-port Y-parameters:

Inductor1: $y_{11}{}^{1L}, y_{12}{}^{1L}, y_{21}{}^{1L}, y_{22}{}^{1L}$

Inductor2: $y_{11}{}^{2L}, y_{12}{}^{2L}, y_{21}{}^{2L}, y_{22}{}^{2L}$

Inductor3: $y_{11}{}^{3L}, y_{12}{}^{3L}, y_{21}{}^{3L}, y_{22}{}^{3L}$

For Inductor1, the Y-parameters represented above are inclusive of a series source impedance $Y_{in}$, as indicated by a reference numeral 124, while a series source impedance Yd, indicated by a reference numeral 136 is included with Inductor3.

The system of linear equations that need to be solved in order to calculate all the node voltages of the circuit can be expressed in matrix form as:

$$\begin{bmatrix} y_{11}^c + y_{22}^{1L} & y_{12}^c & y_{13}^c \\ y_{21}^c & y_{22}^c + y_{11}^{2L} & y_{23}^c \\ y_{31}^c & y_{32}^c & y_{33}^c + y_{11}^{3L} \end{bmatrix} \begin{bmatrix} v_1 \\ v_2 \\ v_3 \end{bmatrix} = \begin{bmatrix} -y_{21}^{1L} v_{in} \\ 0 \\ 0 \end{bmatrix} \quad (7)$$

$$\frac{v_3}{v_{in}} = \frac{-y_{21}^{1L}(y_{21}^c y_{32}^c - y_{31}^c y_{22}^c - y_{31}^c y_{11}^{2L})}{\Delta} \quad (8)$$

For the aforementioned LNA circuit, the inductor labeled Inductor1 is modeled as a two-port network, while the two grounded inductors are modeled as impedances of values $$\left(\frac{1}{y_{11}^{2L}}\right) \text{ and } \left(\frac{1}{y_{11}^{3L}}\right).$$

The node voltage $v_3$ in Equation (7) actually represents the small-signal gain of the LNA circuit for a 1 Volt AC input applied to $v_{in}$ by voltage source 122. The small-signal voltage gain can also be expressed as a transfer function involving combined Y-parameters of the circuit and inductor elements, as shown in Equation (8). The term Δ represents the determinant of the matrix involving circuit and EM Y-parameters. Similarly, quantities like input/output impedance and input reflection coefficient are calculated by using closed form expressions in terms of both circuit and EM Y-parameters. In all, six variables have been used in this exemplary analysis. The three EM variables (overall thickness of the oxide layer, inductor track width, and substrate conductivity) are independent Gaussian random variables. The three circuit variables are gate oxide thickness ($T_{OX}$), zero body-bias threshold voltage ($V_{TH0}$), and reduction in channel length (ΔL). Two of these variables, namely $V_{TH0}$ and $T_{OX}$, are correlated. A Rapid Response Surface Monte Carlo (RSMC) analysis will give the desired PDFs. Some results are presented for the LNA performance parameters in FIGS. 11A, 11B, 12, and 13.

Figure 11A:
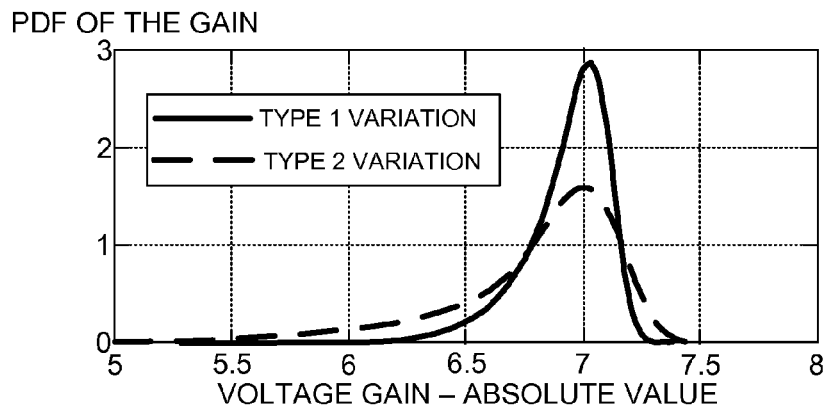
FIGS. 11A and 11B are graphs for the Types 1 and 2 variations, respectively showing the PDA for absolute voltage gain, and the PDA for voltage gain of the LNA of FIG. 9.
Figure 11B:
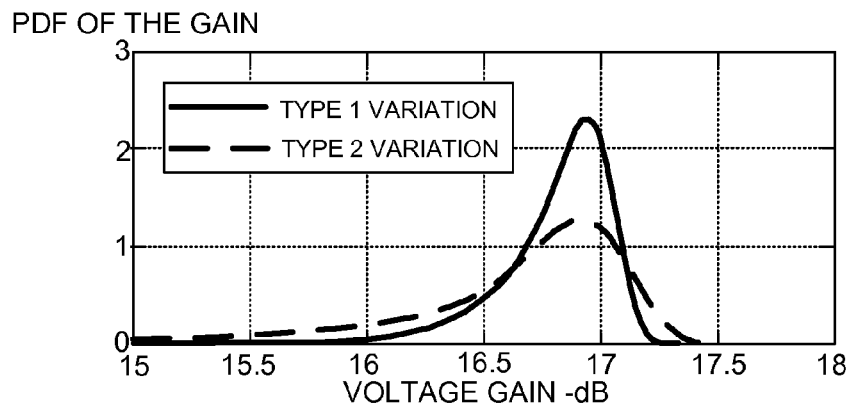

FIGS. 11A and 11B respectively represent the PDF of the absolute voltage gain and the voltage gain for two different types of variations. The Type 1 has the standard deviation of each parameter fixed at 5% of the total range of that parameter and Type 2 has the standard deviation of each parameter fixed at 10% of the total range of that parameter. PDFs for the absolute value of the voltage gain and the voltage gain in dB are shown and it will be evident that both are skewed. The skewness for the voltage gain in dB (−1.51,−2.14) is greater than that of the PDF of the absolute value of the voltage gain (−1.38,−1.78). An interesting observation is that the voltage gain mostly decreases from the mean design in the presence of process variations, and this effect is enhanced by taking into account the variability in the EM objects.

Figure 12:
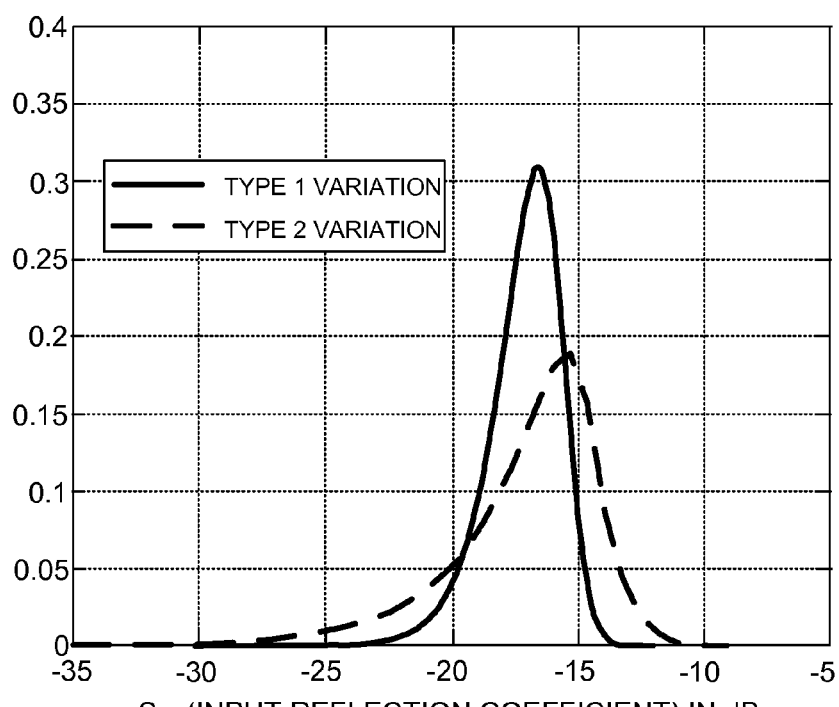
FIG. 12 is a graph showing the Types 1 and 2 variations for PDFs of the input reflection coefficient, for the LNA of FIG. 9.
Figure 13:
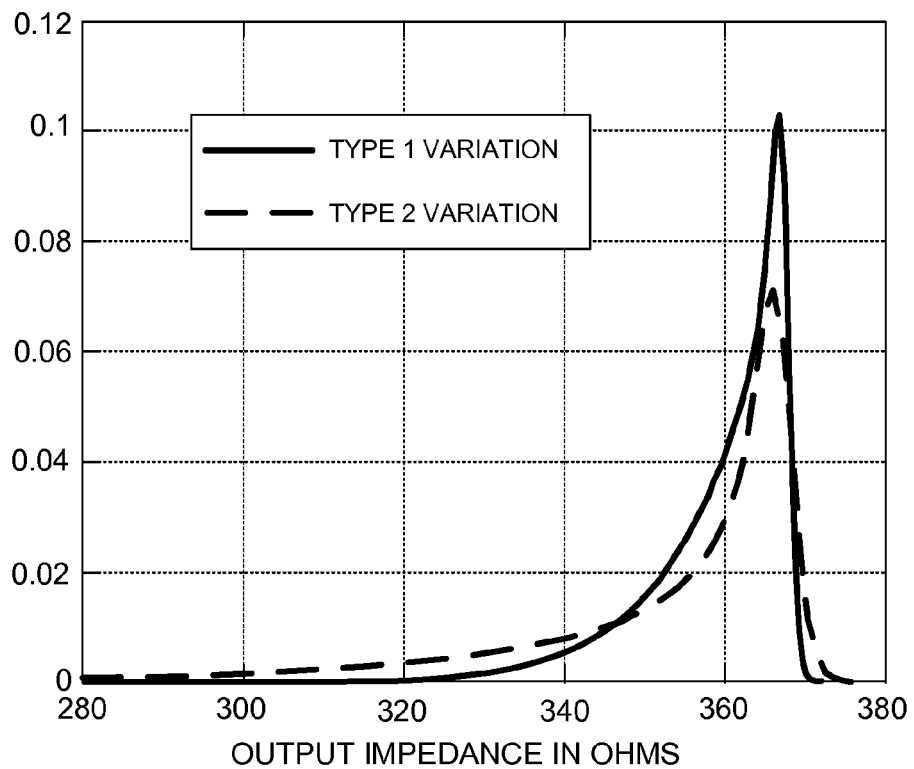
FIG. 13 is a graph showing the Types 1 and 2 variations for PDFs of the output impedance, for the LNA of FIG. 9.

FIG. 12 shows the PDFs for the input reflection coefficient in dB for the same Type 1 and Type 2 variations. Finally, FIG. 13 shows the PDFs for the output impedance in ohms. A calculation of the skewness is made for all of the PDFs, which are summarized in Table II. Interestingly, under process variations, a small percentage of LNAs exhibit a better input return loss behavior compared to the nominal case.

TABLE II

Skewness for the Different PDFs of LNA Performance

| LNA Parameter | Type 1 | Type 2 |
|---|---|---|
| Gain | −1.51 | −2.14 |
| $S_{11}$ (Input Refl. Coeff.) | −0.94 | −1.73 |
| $Z_{out}$ (Output Imped.) | −1.73 | −2.10 |

Figure 14:
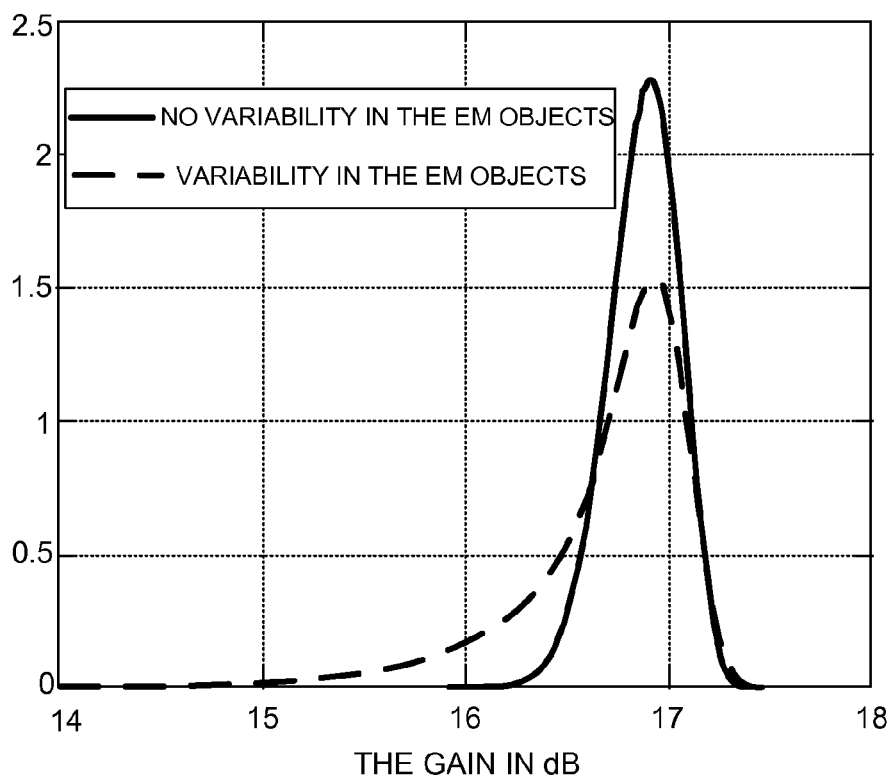
FIG. 14 is a graph showing the effect of the variability of the EM components on the PDF for gain of the LNA in FIG. 9.

Analysis is done without and with the variability of EM components. It can be seen in FIG. 14 that the variability in EM components affects the PDF of the gain significantly. The circuit variability has been kept the same in both cases. All variations are Type 2 variations, as explained above. This result is confirmed by calculating the skewness measures for both the PDF without EM variability, which has a skewness of −0.34, and for the one with EM variability, which has a skewness of −1.67.

Also the kurtosis for these PDFs range from 4.9 to 9.5, showing a significant deviation from the kurtosis of a Gaussian PDF, which is 3. Table III shows the yields for different criteria of performance parameters of the LNA in order to demonstrate the effect of process variations.

TABLE III

Yield Table

| Circuit Performance | Type 1 Variation | Type 2 Variation |
|---|---|---|
| Gain >16.5 dB | 89.28% | 70.45% |
| $S_{11}$ (Input Refl. Coeff.) <−15 dB | 96.58% | 77.85% |
| Overall | 86.23% | 50.06% |

Exemplary Computing Device for Carrying Out this Approach

Figure 16:
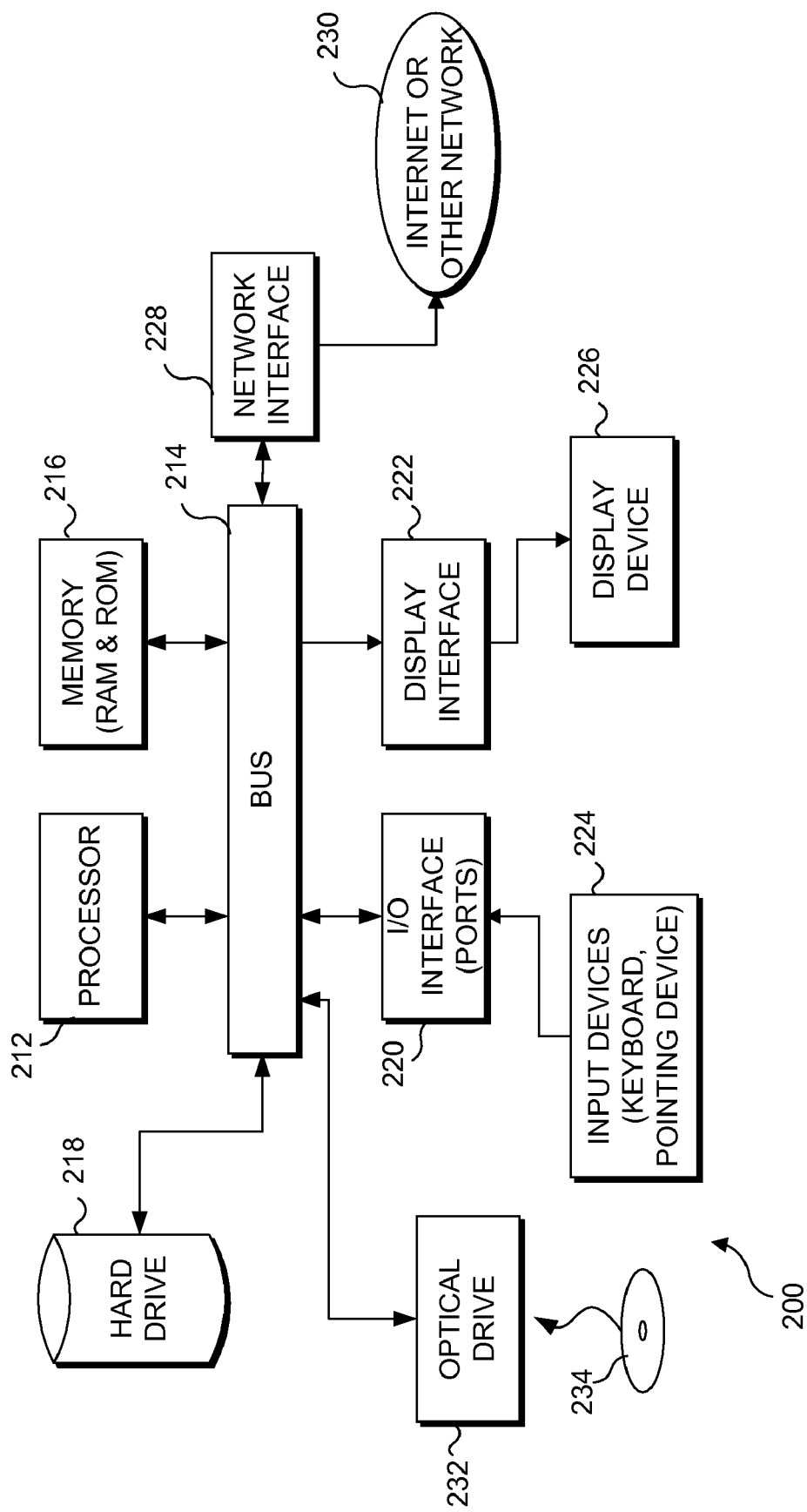
FIG. 16 is a functional block diagram of a computing device (e.g., a personal computer) that is generally usable to carry out the novel approach that is discussed herein.

FIG. 16 illustrates details of a functional block diagram for a computing device 200. The computing device can be a typical personal computer, but can take other forms. A processor 212 is employed for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. Also connected to the bus are a network interface 228, an input/output interface 220 (which may include one or more data ports such as a serial port, a universal serial bus (USB) port, a Firewire (IEEE 1394) port, a parallel port, a personal system/2 (PS/2) port, etc.), and a display interface or adaptor 222. Any one or more of a number of different input devices 224 such as a keyboard, mouse or other pointing device, trackball, touch screen input, etc., are connected to I/O interface 220. A monitor or other display device 226 is coupled to display interface 222, so that a user can view graphics and text produced by the computing system as a result of executing the machine instructions, both in regard to an operating system and any applications being executed by the computing system, enabling a user to interact with the system. An optical drive 232 is included for reading (and optionally writing to) CD-ROM 234, or some other form of optical memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for determining a probability density function (PDF) of at least one performance metric in regard to an electromagnetic (EM) component of an electronic device or system, comprising the steps of:
    (a) providing variability information as an input to a simulation of the EM component, for each randomly varying parameter to be considered in determining the PDF for the at least one performance metric, wherein the variability information for each randomly varying parameter comprises a range and a nominal value for the randomly varying parameter, and wherein the simulation is executed by a processor;
    (b) for all of the randomly varying parameters to be considered, using the simulation executed by the processor to generate a response surface, wherein the response surface is defined over a statistical range for the randomly varying parameter, and as a function of a related variable on which the performance metric is dependent;
    (c) using a random vector generator executed by the processor to produce probabilities that the randomly varying parameter will be within each of a plurality of different incremental portions of the range provided in step (a), wherein the random vector generator employs a correlation matrix that correlates values of the randomly varying parameter with the related variable;
    (d) extracting the related variable from the response surface, based upon the probabilities of the randomly varying parameter; and
    (e) determining the PDF for each performance metric evaluated in regard to the EM component, as a function of the probabilities of each randomly varying parameter, relative to the related variable.

2. The method of claim 1, wherein the step of using the simulation to generate the response surface comprises the step of using a field solver to compute the related variable at terminals of each EM component.

3. The method of claim 2, wherein the field solver carries out a plurality of steps, including:
    (a) decomposing each EM component into an equivalent set of interior and exterior regions, each interior region having a bounding surface;
    (b) computing scattering due to each EM component using equivalent electric and magnetic surface currents; and
    (c) solving for the electric and magnetic surface currents using the Method of Moments, enabling the response surface to be produced in regard to the related variable.

4. The method of claim 1, wherein the at least one performance metric further depends on at least one randomly varying process parameter of a circuit comprising the electronic device or system, further comprising the steps of:
    (a) providing variability information for each randomly varying process parameter of the circuit, a list of the randomly varying process parameters for the circuit, and a netlist that describes a connectivity of the circuit, as an input to a general purpose circuit simulation program, wherein the variability information for each randomly varying process parameter comprises a range and a nominal value for the randomly varying process parameter;
    (b) for each of the randomly varying process parameters of the circuit to be considered, using the general purpose simulation program to generate a response surface, wherein the response surface is defined over a statistical range for the randomly varying process parameter, and as a function of a related circuit variable on which the performance metric is dependent;
    (c) using the random vector generator to produce probabilities that each randomly varying process parameter will be within each of a plurality of different incremental portions of the range provided for the randomly varying process parameter, wherein the random vector generator employs a correlation matrix that correlates values of the randomly varying process parameter with the related circuit variable for ports of an EM component;
    (d) extracting the related circuit variable from the response surface, based upon the probabilities of the randomly varying parameter;
    (e) merging each related circuit variable and each related variable for the EM component; and
    (f) determining the PDF of the at least one performance metric for the electronic device or system as a function of each related circuit variable and each related variable that have been merged.

5. The method of claim 4, wherein the general purpose circuit simulation program comprises a Simulation Program for Integrated Circuits Emphasis (SPICE) software program.

6. The method of claim 4, further comprising the step of transforming a large number of possibly correlated related circuit variables into a smaller number of uncorrelated related circuit variables, for the circuit.

7. The method of claim 1, further comprising the step of transforming a large number of possibly correlated related variables into a smaller number of uncorrelated related variables for one or more EM components.

8. The method of claim 4, further comprising the step of determining each point where the EM component connects to the circuit, each such point comprising a port for the EM component.

9. The method of claim 4, wherein the at least one performance metric is determined based upon at least one randomly varying parameter that is non-Gaussian and numerical.

10. The method of claim 4, wherein the step of determining the PDF for each performance metric uses randomly varying parameters and randomly varying process parameters that are Gaussian and either correlated or uncorrelated and is carried out without an intermediate step of determining non-Gaussian PDFs for any randomly varying process parameter or randomly varying parameter.

11. A system for determining a probability density function (PDF) of at least one performance metric in regard to an electromagnetic (EM) component of an electronic device or system, comprising:
    (a) a memory for storing machine executable instructions, and variability information for each randomly varying parameter to be considered in determining the PDF for the at least one performance metric, the variability information for each randomly varying parameter comprising a range and a nominal value for the randomly varying parameter;

(b) an output device for presenting the PDF of the at least one performance metric to a user; and (c) a processor that is coupled to the memory and the output device, the processor executing the machine executable instructions to carry out a plurality of functions, including:

(i) accessing the variability information as an input to a simulation of the EM component;

(ii) for all of the randomly varying parameters to be considered, using the simulation to generate a response surface, wherein the response surface is defined over a statistical range for the randomly varying parameter, and as a function of a related variable on which the performance metric is dependent;

(iii) executing a random vector generator to produce probabilities that the randomly varying parameter will be within each of a plurality of different incremental portions of the range, wherein the random vector generator employs a correlation matrix that correlates values of the randomly varying parameter with the related variable;

(iv) extracting the related variable from the response surface, based upon the probabilities of the randomly varying parameter; and (v) determining the PDF for each performance metric evaluated in regard to the EM component, as a function of the probabilities of each randomly varying parameter, relative to the related variable.

12. The system of claim 11, further comprising the step of enabling a user to access the PDF for any performance metric that was evaluated, by causing the processor to present the PDF on the output device.

13. The system of claim 11, wherein execution of the machine executable instructions further causes the processor to use a field solver to compute the related variable at terminals of each EM component to generate the response surface.

14. The system of claim 13, wherein execution of the machine executable instructions further causes the processor to:

(a) decompose each EM component into an equivalent set of interior and exterior regions, each interior region having a bounding surface;

(b) compute scattering due to each EM component using equivalent electric and magnetic surface currents; and (c) solve for the electric and magnetic surface currents using the Method of Moments, enabling the response surface to be produced in regard to the related variable.

15. The system of claim 11, wherein the at least one performance metric further depends on at least one randomly varying process parameter of a circuit comprising the electronic device or system, execution of the machine executable instructions further causing the processor to:

(a) provide input to a general purpose circuit simulation program by accessing variability information for each randomly varying process parameter of the circuit, a list of the randomly varying process parameters for the circuit, and a netlist that describes a connectivity of the circuit that are also stored in the memory, wherein the variability information for each randomly varying process parameter comprises a range and a nominal value for the randomly varying process parameter;

(b) for each of the randomly varying process parameters of the circuit to be considered, using the general purpose simulation program to generate a response surface, wherein the response surface is defined over a statistical range for the randomly varying process parameter, and as a function of a related circuit variable on which the performance metric is dependent;

(c) use the random vector generator to produce probabilities that each randomly varying process parameter will be within each of a plurality of different incremental portions of the range provided for the randomly varying process parameter, wherein the random vector generator employs a correlation matrix that correlates values of the randomly varying process parameter with the related circuit variable for ports of an EM component;

(d) extract the related circuit variable from the response surface, based upon the probabilities of the randomly varying parameter;

(e) merge each related circuit variable and each related variable for the EM component; and (f) determine the PDF of the at least one performance metric for the electronic device or system as a function of each related circuit variable and each related variable that have been merged.

16. The system of claim 15, wherein the general purpose circuit simulation program comprises a Simulation Program for Integrated Circuits Emphasis (SPICE) software program.

17. The system of claim 15, wherein execution of the machine executable instructions further causes the processor to transform a large number of possibly correlated related circuit variables into a smaller number of uncorrelated related circuit variables, for the circuit.

18. The system of claim 11, wherein execution of the machine executable instructions further causes the processor to transform a large number of possibly correlated related variables into a smaller number of uncorrelated related variables for one or more EM components.

19. The system of claim 15, wherein execution of the machine executable instructions further causes the processor to determine each point where the EM component connects to the circuit, each such point comprising a port for the EM component.

20. The system of claim 15, wherein execution of the machine executable instructions further causes the processor to determine the at least one performance metric based upon at least one randomly varying parameter that is non-Gaussian and numerical.

21. The system of claim 15, wherein execution of the machine executable instructions further causes the processor to determine the PDF for each performance metric using randomly varying parameters and randomly varying process parameters that are Gaussian and either correlated or uncorrelated, and without performing an intermediate determination of non-Gaussian PDFs for any randomly varying process parameter or randomly varying parameter.

* * * * *